United States Patent
Gazuit et al.

[11] Patent Number: 6,041,841
[45] Date of Patent: Mar. 28, 2000

[54] MANUFACTURE OF CARCASS REINFORCEMENT FOR A TIRE USING TWO CARCASS HALF-REINFORCEMENTS

[75] Inventors: Georges Gazuit, Montlucon; Adam Jara, Clermont-Ferrand, both of France

[73] Assignee: Compagnie Generale Des Etablisse-Michelin - Michelin & CIE, Clermont-Ferrand, France

[21] Appl. No.: 09/148,274

[22] Filed: Sep. 4, 1998

Related U.S. Application Data

[62] Division of application No. 08/975,019, Nov. 20, 1997, Pat. No. 5,861,073.

[30] Foreign Application Priority Data

Nov. 21, 1996 [FR] France ................................ 96 14357

[51] Int. Cl.⁷ .................................................. B29D 30/16
[52] U.S. Cl. ............................................ 156/397; 156/133
[58] Field of Search ................................ 156/397, 117, 156/133, 134, 123, 126, 130.7; 152/548, 551, 550, 563

[56] References Cited

U.S. PATENT DOCUMENTS

| | | | |
|---|---|---|---|
| 1,200,016 | 10/1916 | Paridon | 156/397 |
| 1,259,997 | 5/1918 | Kline | 156/397 |
| 1,818,944 | 8/1931 | Darrow | 152/548 |
| 1,898,886 | 2/1933 | Murphy | 152/548 |
| 2,139,840 | 12/1938 | McKone . | |
| 3,057,396 | 10/1962 | Hanson | 156/397 |
| 3,975,490 | 8/1976 | Lapeyre | 156/123 |
| 4,451,313 | 5/1984 | Jackson . | |
| 5,462,104 | 10/1995 | Siegenthaler | 156/117 |

FOREIGN PATENT DOCUMENTS

| | | |
|---|---|---|
| 0658449 | 6/1995 | European Pat. Off. . |
| 2064753 | 7/1972 | Germany . |
| 901599 | 7/1962 | United Kingdom . |

*Primary Examiner*—Geoffrey L. Knable
*Attorney, Agent, or Firm*—Baker Botts L.L.P.

[57] ABSTRACT

The machine for manufacturing a tire carcass half-reinforcement from a single filament wrapped around a bead wire which includes: bead wire holders operated by actuating cylinders, allowing said bead wire to be held in a predetermined position; a ring which has half as many hooks as there will be arches of carcass filament contained in the tire that is to be manufactured, the ring being held a predetermined distance away from said bead wire; a reel of filament which is moved in the central space of the bead wire, wrapped around it, the path crossing the plane of the ring and passing radially inside it; and a mechanism for hooking the filament onto each of the hooks.

9 Claims, 8 Drawing Sheets

MANUFACTURE OF CARCASS REINFORCEMENT FOR A TIRE USING TWO CARCASS HALF-REINFORCEMENTS

This is a division of copending application Ser. No. 08/975,019 filed Nov. 20, 1997 now U.S. Pat. No. 5,861,073.

BACKGROUND OF THE INVENTION

The present invention relates to tires. More particularly, it relates to the arrangement of reinforcing filaments in the beads, and more generally, deals with producing the carcass.

Tire carcass reinforcements usually consist of one or more plies, currently usually radial plies, wrapped around one or more bead wires arranged in the beads. The beads constitute the means that allow the tire to be fixed to the wheel rim. The fact that the carcass reinforcements consist of plies means that these need to be produced by calendering them cut at the desired angle (90° to the direction of the filaments for a radial carcass) into pieces of the desired length, these pieces then being joined together by welding parallel to the filaments. All these operations constitute separate preparatory steps in the actual assembly of the tire. The existence of these preparatory early steps makes managing work flow through manufacturing shops more complicated.

It has previously been proposed that tire carcasses be produced from a single filament. The difficulty in this case lies in designing carcasses which are durable enough to fulfill their function of being a structure that reinforces the tire and which, by the path taken by the carcass filament, are as easy as possible to produce in a mechanized way.

As an illustration, the proposals contained in patents U.S. Pat. No. 4,277,295 and U.S. Pat. No. 5,308,432 may be mentioned. However, mechanizing the movements of a laying member that carries out the first of these proposals is not simple. Furthermore, having knots or crossing filaments in the bead of the tire is not recommended because the tension of the filaments in this region is considerable. As regards the second proposal, it has the drawback of transferring the reel from one line to the other on each side of the tire. Furthermore, given the bulk of the reel and of its movement means, it is not possible either in the first proposal or in the second for the last carcass-reinforcing arches to be laid with said reel continuing the same movement. The problem is that at the end of laying, the mechanism comes up against the first arches laid well before the last ones have been laid, this point being reached all the earlier, the bulkier the reel.

Now, in practice, a reel of this kind is quite bulky. It is therefore difficult to make it accelerate a great many times, because of its weight and its inertia and it is difficult to make it run around the bead wire because the space available is small, especially if the tire is manufactured on a former which more or less corresponds to its future internal volume, this being especially true if the bead wire is close to the end-position it will occupy in the finished tire.

SUMMARY OF THE INVENTION

The object of the invention is to propose a new carcass reinforcement composed of two symmetric elements connected at the crown, each of which is produced from a single filament, which has the required mechanical strength and endurance. Each half-reinforcement is produced using a simple, technique which has the flexibility of allowing use of half-reinforcements of different sizes and/or using different types of filament or types of material to be produced. The targeted objective of the invention is to mechanize the movements of said simple and flexible machine.

According to the invention, the method for manufacturing a tire carcass half-reinforcement from a single filament wrapped around a bead wire includes:

holding said tire bead wire, positioning a ring a predetermined distance away from said bead wire, so that it is approximately coaxial therewith, the planes of said bead wire and of said ring being more or less parallel, said ring having half as many hooks as there will be arches of carcass filament contained in the tire that is to be manufactured.

hooking the filament onto said hooks using means for laying said filament which perform a function of guiding said filament, forming a loop, the two strands of which are directed toward the bead wire and wrapped around it, each of the strands running on to the adjacent hook after wrapping around the bead wire, positioning a support which more or less defines the shape of the internal cavity of said tire so that said bead wire finally sits beside said support, said support being positioned with respect to the bead wire on the opposite side to said ring, removing said loops from the hooks and transferring them onto the support.

A machine for implementing said method comprises:

a central device allowing said tire bead wire to be held in a predetermined position, a lateral device intended to hold a ring which has half as many hooks as there will be arches of carcass filament contained in the tire to be manufactured, said lateral device holding said ring a predetermined distance away from said bead wire and approximately concentric therewith, the planes of said bead wire and of said ring being more or less parallel, said hooks being spread out around the circumference of the ring, means for laying the filament for hooking the filament onto said hooks, forming a loop, the two strands of which are directed toward the bead wire and wrapped around it, each of the strands running on to the adjacent hook after wrapping around the bead wire.

In this text, the term "filament" denotes very generally both monofilaments and multifilaments or assemblies, such as textile or metal cords, twisted cords or indeed any type of equivalent assembly, such as compound cords for example, and this will be true irrespective of the material or materials or possible treatment of these filaments, for example a surface treatment or coating, or prior application of adhesive to encourage them to stick to the rubber or any other material.

Because there are loops at the tread, and because there is wrapping around the bead wire, it can be seen that the carcass reinforcement is constructed from a single filament. Of course, it would be possible for the carcass reinforcement not to be manufactured continuously from a single filament. There could be a discontinuity in the filament, for example, as a result of a change of reel. According to the present invention, it is, however, appropriate for just one filament or a small number of filaments to be used per carcass reinforcement, and the starts and ends of the filaments should be positioned under the tread to avoid any discontinuities in the bottom of the bead (knots for example).

Joining the two symmetric carcass half-reinforcements together presents no problems when the joinder is under the tread because it is known that the tensile forces in the filaments forming the reinforcement are practically zero at this point. Producing the carcass as half-reinforcements makes it possible to simplify the industrial installation required and makes it possible to obtain a method which is very robust from the industrial viewpoint.

The invention will be better understood from the description of the embodiments with reference to the drawings.

DESCRIPTION OF PREFERRED EMBODIMENTS

Figure 1:
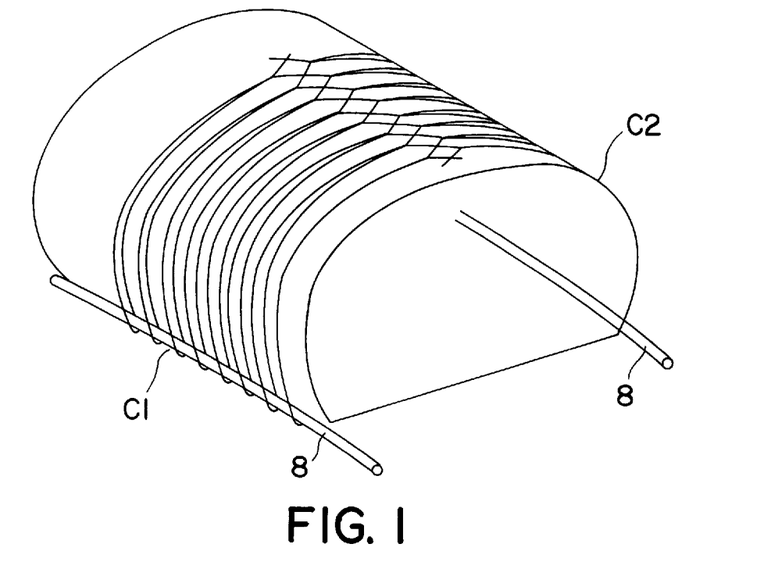
FIG. 1 shows the carcass reinforcement in the tire composed of two half-reinforcements connected at the crown.
Figure 2:
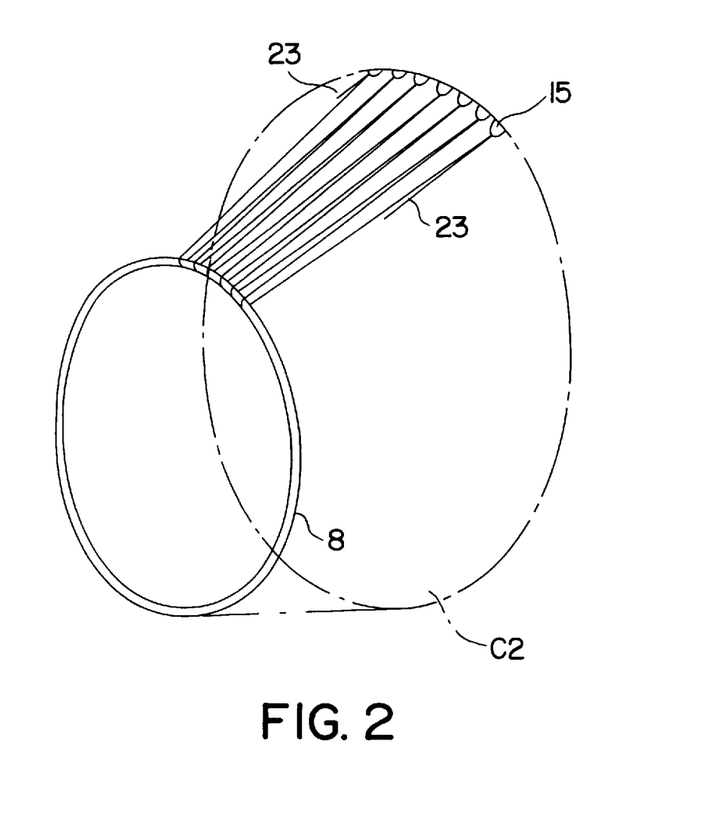
FIG. 2 shows a half-reinforcement at an intermediate stage of its manufacture.

The principle involved in producing a carcass reinforcement, which is common to all the alternative forms illustrating the invention, consists in producing two carcass half-reinforcements $C_1$ and $C_2$ (see FIG. 1) separately. Each of these carcass half-reinforcements is produced from just one filament 23 (see FIG. 2) which is wrapped around a bead wire 8 and hooked onto hooks 15 supported by a ring 14. FIG. 2 shows the appearance of a carcass half-reinforcement $C_2$ at a certain stage in its manufacture. In what follows, a number of methods which allow the stage shown in FIG. 2 to be reached, and various methods of getting from this stage to the one depicted in FIG. 1, will be described.

Figure 3:
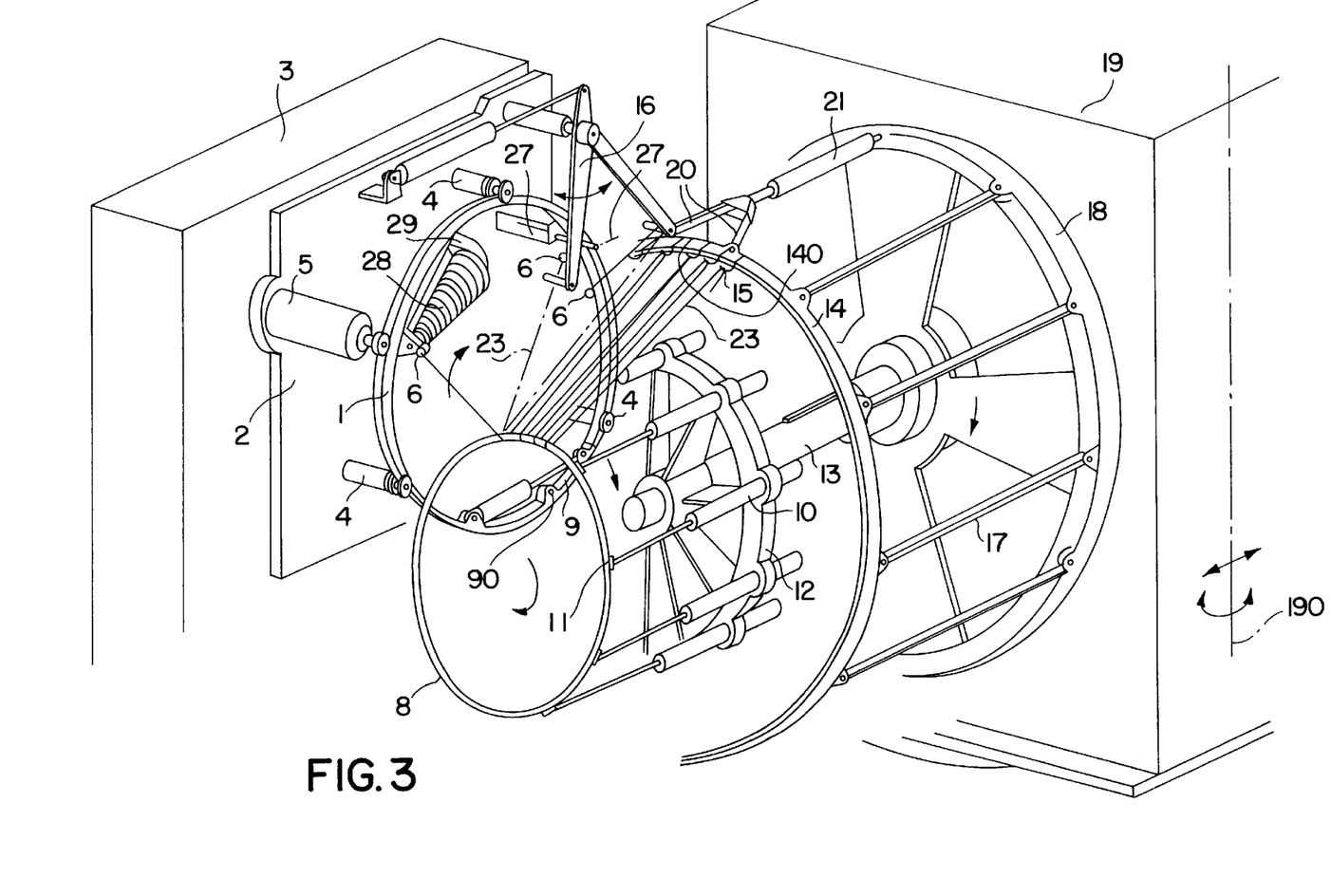
FIG. 3 is a perspective of a first alternative form of a machine, which hooks the filaments directly, using a conical reel.
Figure 4:
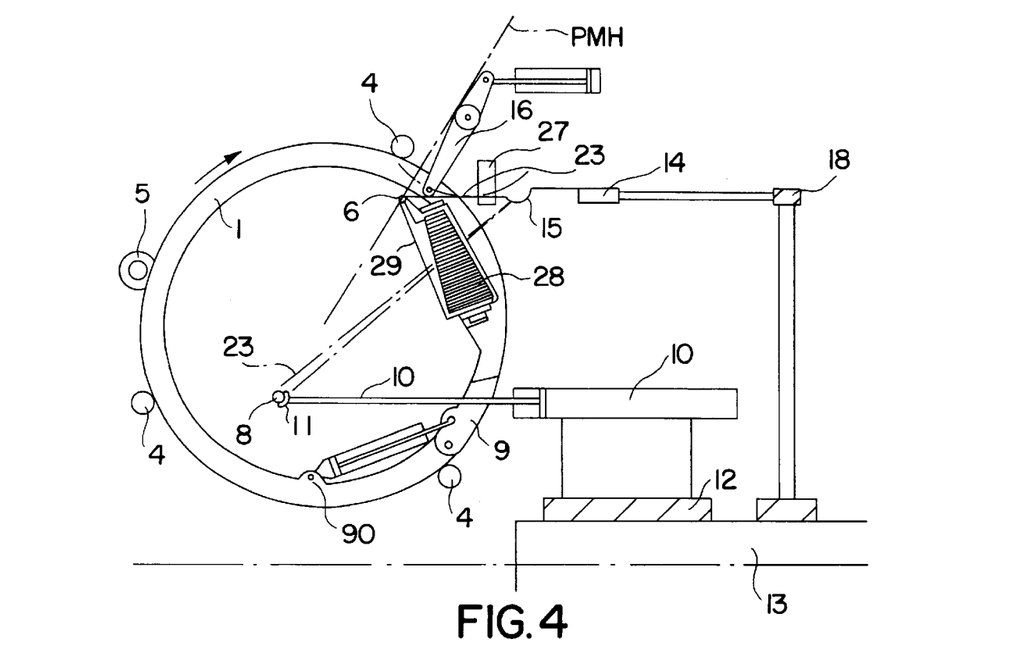
FIG. 4 is a sectional view of the main parts of the same machine.

A first embodiment of the invention is explained below with the aid of FIGS. 3 to 5. This first embodiment works on the principle of hooking the filament directly onto the hooks 15 of the ring 14. In this alternative form, the method comprises the following steps, which are intended for hooking the filament onto said hooks:

configuring said laying means so that they define a path running in a plane more or less perpendicular to the plane of said bead wire, said path passing through the central space of the bead wire and wrapping around this wire, said path crossing the plane of the ring and passing radially inside it, connecting the filament to said first hook, making said laying means run along said path, while turning said bead wire and said ring in a mutually-coordinated fashion at the desired laying pitch, and thus gradually producing windings of filament wrapped around said bead wire and forming loops hooked onto said hooks, connecting the filament to said last hook, withdrawing said laying means.

Very advantageously, the path of the laying means is circular. This is what occurs in the example described. In one of the possible embodiments, the laying means comprise a housing intended to hold a reel of filament, and said laying means have a movement always pointed in the same direction, the movement here being circular.

A machine constructed to implement the alternative form of method which has just been mentioned is therefore one such that said laying means comprise:

a housing for mounting a reel of filament, said housing being connected to guide means defining a path running in a plane perpendicular to the plane of said bead wire, said path passing through the central space of the bead wire and running around this bead wire, said path crossing the plane of the ring and passing radially inside it, motorized means allowing said housing to move along said path, while rotating said bead wire and said ring in a coordinated fashion at the desired laying pitch.

In the various figures, there is shown a filament-laying device 1 of circular shape supporting a reel 28. The device 1 includes a ring which is centered axially by three rollers 4 arranged at 120° from one another and fixed to a frame 2 forming part of a supporting structure 3 of the machine. The device 1 is driven by a motor 5. The reel 28 is mounted on said filament-laying device 1 in a suitable housing 29. The length of filament on the reel 28 corresponds to the developed length of filament forming the entire carcass half-reinforcement increased by a safety margin which prevents the filament from running out before the operation of manufacturing the half-reinforcement is completely finished. The filament-laying device 1 also comprises a section 9 that can tilt about a hinge 90 so as to able to create an opening allowing a bead wire 8 to be inserted or extracted (FIGS. 3 and 4). There is also shown a moving finger 16, mounted on the supporting structure 3.

A supporting structure 19 supports a horizontal shaft 13. The shaft 13 supports a flywheel 18 centered on the shaft 13 of the machine and mounted so that it can slide along this shaft. The supporting structure also supports an annulus 12, also centered on the shaft 13 of the machine and mounted so that it can slide along this shaft. The annulus 12 at its periphery has a series of actuating cylinders 10 operating bead wire holders 11. A bead wire 8 can be mounted on the bead wire holders 11.

The flywheel 18 accommodates a ring 14. The latter is carried by flexible arms 17 parallel to the axis of the machine. The ring 14 is split between two hooks. The slit thus defines two lips 140 (see FIG. 3). On either side of the slit there is a first hook and a last hook. The ring 14 is elastically deformable. Two connecting rods 20 controlled by an actuating cylinder 21 allow the lips 140 of the slit to be parted so as to open up the ring 14. The supporting structure 19 is mounted so that it can pivot about a vertical axis 190 so that it can either present the parts it supports to the filament-laying means carried by the supporting structure 3, or present them to a station for assembling the half-reinforcement over a former, as described below with the aid of FIGS. 8, 9 and 10. depending on the operations to be performed.

Figure 5A:
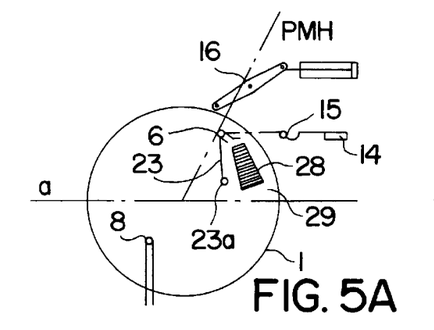
FIGS. 5a, 5b, 5c and 5d show diagrammatically the manufacture of a half-reinforcement with the use of a conical reel.

Producing a half-reinforcement using the machine according to the first alternative form comprises the operations defined below, the filament-laying device 1 starting from the position PMH (FIG. 5*a*).

Figure 5B:
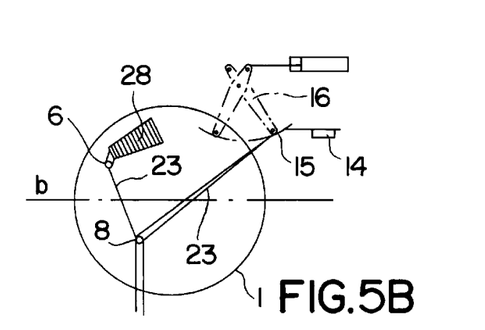
Figure 5C:
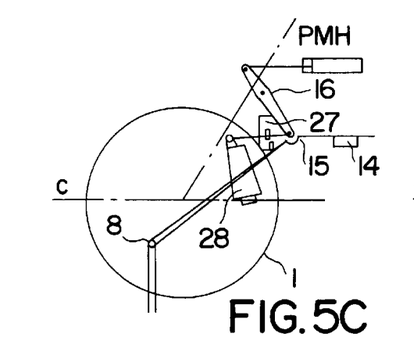
Figure 5D:
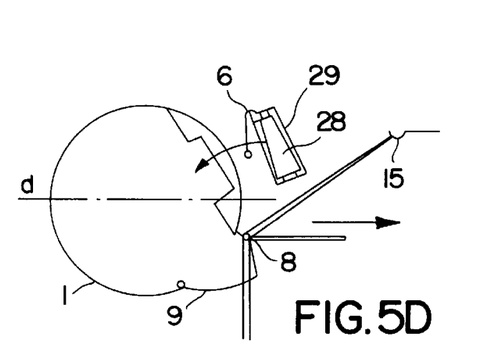

1. Fixing the conical reel 28 into the housing 29.
2. Attaching the end, previously bent into a loop 230, of the filament 23 to any one of the hooks 15.
3. Starting the synchronized rotation of the assembly consisting of the bead wire 8 and the ring 14 with the filament-laying device 1; for each revolution of the filament-laying device 1, the ring 14 and the bead wire 8 are shifted continuously and simultaneously through an angle which corresponds to a pitch equal to the spacing between hooks 15.
4. Because the filament-laying device 1 rotates on itself, on each revolution the filament 23 is wrapped around the bead wire 8 (FIG. 5*b*). The finger 16 is standing by outside the path of the filament 23. As the reel 28 passes near to the ring 14, the filament is intercepted by the finger 16 (FIGS. 5*b* and 5*c*). This thus forms a loop that the finger 16 carries a little beyond the hook 15 (FIG. 5*c*), and the continued rotation of the reel 28 allows the filament to be 10 hooked onto the hook 15.
5. Considering next the rotation of the bead wire 8 on itself, we should note that when one of the bead wire holders 11 comes close to the filament-laying device 1, the corresponding actuating cylinder 10 (FIGS. 3 and 4) retracts to allow the filament-laying device 1 to pass freely. The actuating cylinder 10 returns to its position of holding the bead wire 8 after the filament-laying device 1 has passed by.
6. Gradually, the basic sequence defined hereinabove is repeated to obtain a full half-reinforcement. At the latest, before the manufacture of said half-reinforcement is complete, the ring 14 is opened wide enough to allow hooking to continue until the hook before the one onto which the filament was hooked right at the beginning of the operation is reached and this is done taking the bulk of the filament-laying device 1 into account. This opening is controlled by the actuating cylinder 21, as explained hereinabove.
10. The very last hooking operation is performed on the starting hook, forming a loop. The filament 23 is bonded to the loop and the end is then cut off with the cutter 27 (FIG. 5).
11. The reel is removed and replaced by a new reel (FIG. 5*d*). This first method, with the filament being hooked on directly, can be used in other alternative forms regarding the means of storing the required amount of filament on the filament-laying device 1, for example providing a stock on board the filament-laying device 1, and automatically fed with the amount needed between the manufacturing of two carcass half-reinforcements.

Figure 6:
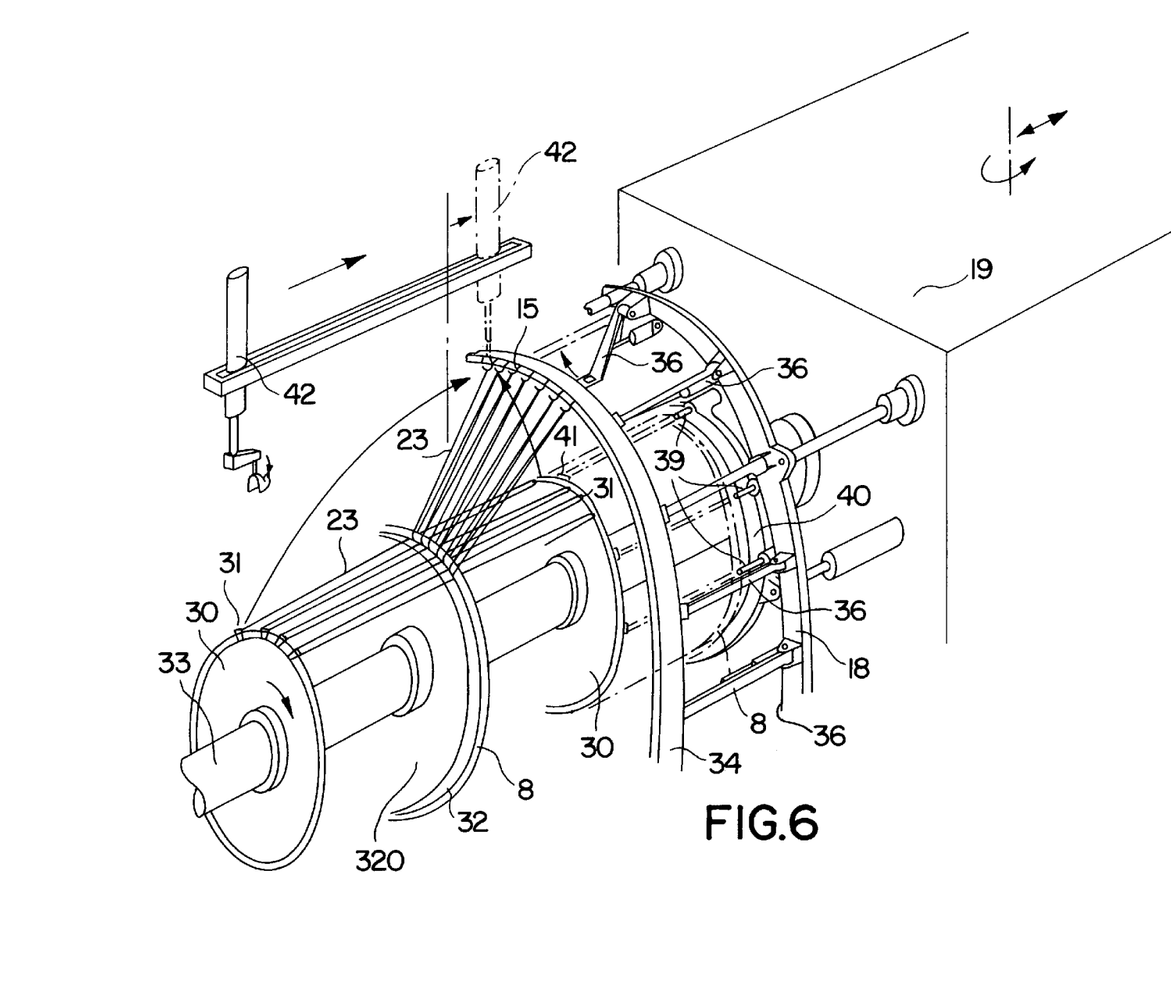
FIG. 6 is a perspective of a form of a machine which prepositions the filament.
Figures 7A, 7B, 7C:
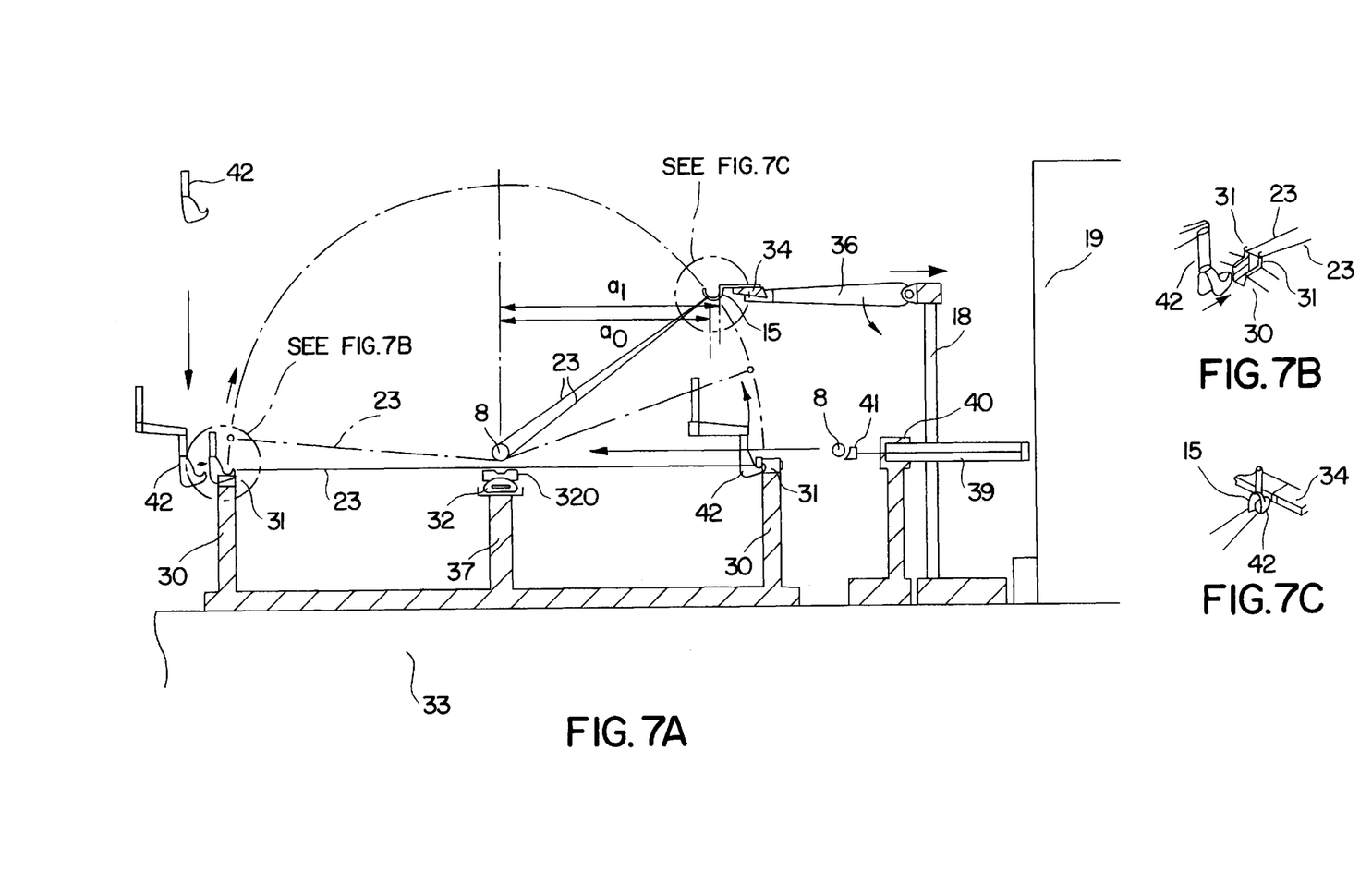
FIG. 7 is a partial sectional of the second machine.

A second alternative form of the invention is explained hereinbelow (FIGS. 6 and 7). The same references are used to denote elements which are identical or at least fulfill a similar function. In this embodiment, a circumferentially continuous and rigid ring 34 supports the hooks 15 in much the same way as the ring 14. In this alternative form, instead of directly hooking the filament on, a principle known as prepositioning the filament is used. In this second alternative form, the method comprises the following steps, intended for hooking the filament onto said hooks:

the filament is hooked onto auxiliary hooks arranged in two circles separated by the distance that corresponds to twice the length of the filament from the bead wire as far as the end of said carcass half-reinforcement, so that the filament thus defines an axisymmetric figure in space by a number of back and forth runs forming a loop around each auxiliary hook of each circle, slipping said bead wire radially over said axisymmetric figure, and positioning it halfway between the circles of auxiliary hooks, transferring said loops from said auxiliary hooks onto said hooks by lifting up the filament on either side of said bead wire.

A machine designed to implement this second alternative form of the method is therefore such that the laying means comprise:

auxiliary hooks arranged in two circles separated by a distance that corresponds to twice the length of filament from the bead wire as far as the end of said carcass half-reinforcement.

paying-out means allowing the filament to be hooked successively onto said auxiliary hooks of each circle, means for inserting said bead wire radially over said auxiliary hooks and positioning it halfway between the circles of auxiliary hooks, auxiliary transfer means for transferring said loops from said auxiliary hooks onto said hooks, lifting up the filament on either side of said bead wire.

The supporting structure 19 via the shaft 33 supports an assembly comprising said closed and rigid ring 34, on which the hooks 15 are mounted. The ring 34 is supported by retractable arms 36, mounted on and articulated to the flywheel 18. The shaft 33 also supports two circles 30 on which auxiliary hooks 31 are mounted. Positioned on the shaft 33 an appropriate distance between the two circles 30 is a flange 37 which carries an inflatable bladder 32.

The filament 23 is hooked onto the auxiliary hooks 31 by an additional mechanism which, in order not to overburden the drawing, has not been depicted. The filament 23 will thus form a kind of cylinder in space. After the filament 23 has been fully hooked onto the auxiliary hooks 31, the bead wire 8 is put in place by the bead wire holder 41 (FIGS. 6 and 7) operated by the actuating cylinders 39. The bead wire 8 is locked in place by the bladder 32, trapping the filaments 23 between the bead wire 8 and a pad 320.

Two grippers 42 (one gripper on each side of the bead wire) pick up each of the ends of the strands formed by the filament 23 resting on each auxiliary hook 31 and position this filament on the hooks 15 of the closed and rigid ring 34. In a way similar to what was explained hereinabove with regard to the bead wire holders 11, the retractable arms 36 need to be retracted one after another in order not to hamper the movement of the gripper 42. Note also that one and the same gripper could be used for transferring the loops from the auxiliary hooks 31 to the hooks 15. Once the transfer operation is over, the actuating cylinders 10 will press the bead wire holders 11 against the bead wire 8. The bladder 32 is then deflated. The supporting structure 19 retreats and pivots through 180° to offer the carcass half-reinforcement up to the next station as was already mentioned hereinabove.

The remainder of the description deals with the phase of laying two carcass half-reinforcements on a former.

Figure 8:
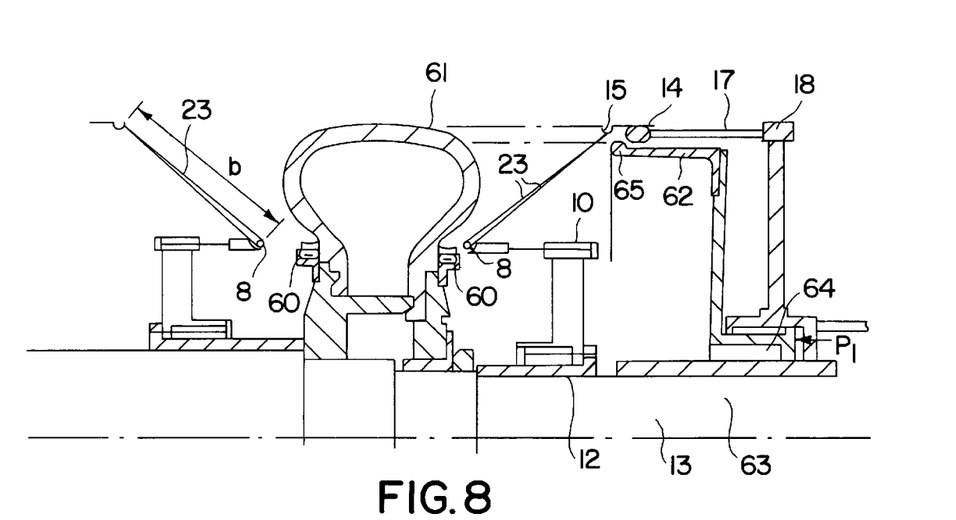
FIG. 8 shows a later stage in the manufacture of the carcass reinforcement, which can be used with both alternative forms.
Figure 9:
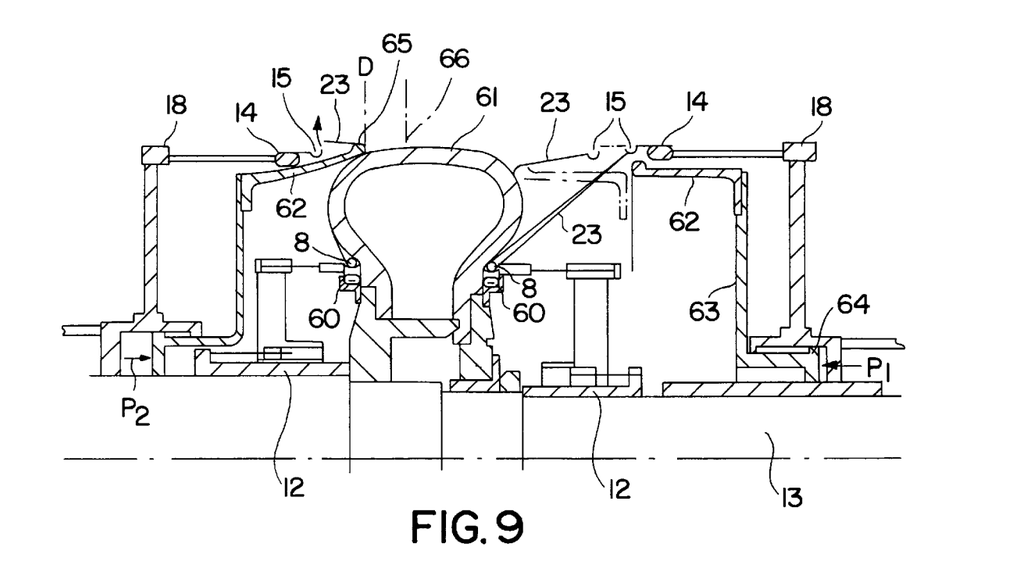
FIG. 9 shows the laying of the carcass half-reinforcements with the aid of an elastic cylindrical wall that can be used in both alternative forms.

For each of the two alternative embodiments described hereinabove, it is conceivable that the half-reinforcements be thus laid down using a device with an elastic cylindrical wall (FIGS. 8 and 9).

A device for laying the half-reinforcement includes said ring 14 fitted with hooks 15 and supported by the flywheel 18 sliding along the shaft 13 advances axially from its initial position as far as the axis of the former 61 (FIG. 8). An elastic cylindrical wall 62 is supported by a spacing piece 63. The latter rests against the flywheel 18 via a pneumatic actuating cylinder 64. The pneumatic actuating cylinder 64 experiences a first pressure P1 which, irrespective of the position of advancement of the ring 14, allows the filaments 23 forming the half-reinforcement to be kept at a constant length b and constant tension T1. The tension T1 depends on the pressure P1 inside the actuating cylinder 64. When the elastic cylindrical wall 62 comes into contact with the former 61 (FIG. 9), the pressure in the actuating cylinder 64 increases to a pressure P2, causing said elastic cylindrical wall to expand. The ring 14 continues to advance toward the former 61.

The filaments 23 are thus pressed and held against the former 61. When the snout 65 of said elastic cylindrical wall reaches the point D, said snout passes over the position of the hook 15, and this unhooks the filaments 23 from the hooks 15. The pressure P2 pushes the elastic cylindrical wall as far as the position for laying the filaments 23 (FIG. 9). Once the half-reinforcement has been pressed against the former 61, the elastic cylindrical wall 62 returns to its initial position.

Figure 10:
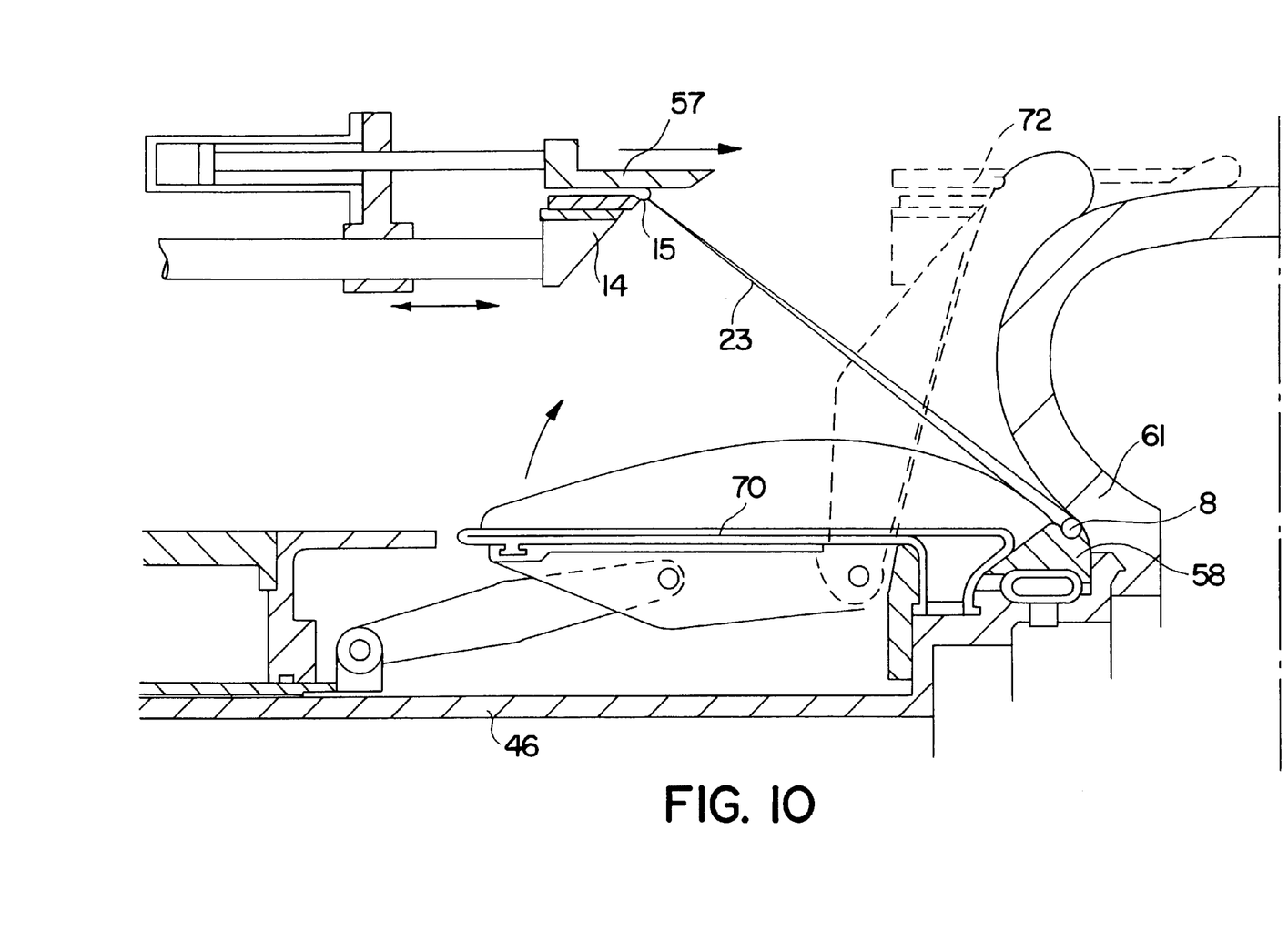
FIG. 10 shows the laying of the carcass half-reinforcements with the aid of an inflatable bladder that can be used with both alternative forms.

Another possible way of connecting two carcass half-reinforcements together utilizes an inflatable bladder 70 (FIG. 10).

In the alternative form of FIG. 10, a bladder 70 is inflated to press the filaments 23 of each half-reinforcement against the former 61 with the combined action of lifting blades 71. The ring 14 moves axially to accompany the movement of the filaments 23.

A shroud 57 closes the passage opening of the hooks 15 and prevents the filament 23 from coming off the hook. At the end of the turning back operation, the filaments 23 come into contact with the former under the action of the bladder 70. The shroud 57 is then retracted to position 72 to allow the filament 23 to unhook from the hooks 15. The shroud 57 advances again toward the cap of the former 61, pressing on the bladder 70, which makes it possible to end the laying of the filaments 23 on the former 61.

The rest of the description deals with joining the two carcass half-reinforcements together at the crown of the future tire.

It is known that the tensile forces in the filaments forming the reinforcement of a radial carcass are low or zero under the tread. There is therefore a great deal of freedom to choose connecting means. If the tire is made with a rubber carcass coating, use is preferably made of a former that defines the internal shape of the tire, at least approximately. This former is precoated with nonvulcanized rubber. All that is then required is for said loops to be laid on the rubber coating as need be, pressing them in a little to ensure that the carcass reinforcement will be stable while it is being manufactured. If the carcass is produced by injection or cast in an elastomeric material in the liquid state, for example polyurethane, the two carcass half-reinforcements need to be secured temporarily before the mold is closed, and the elastomer introduced. Thereafter, irrespective of the type of matrix, the fact that the filaments are impregnated in the matrix will give the required cohesion.

Figure 11A:
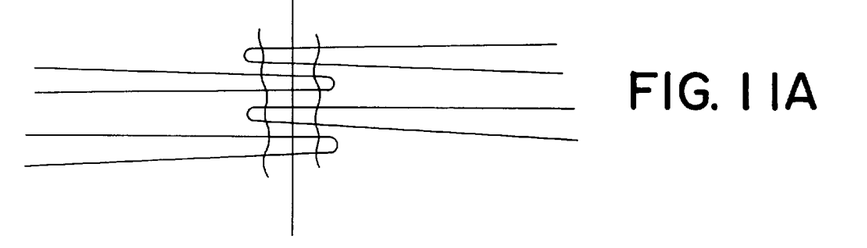
FIGS. 11a, 11b, 11c show the various methods of joining the carcass half-reinforcements together at the crown.
Figure 11B:
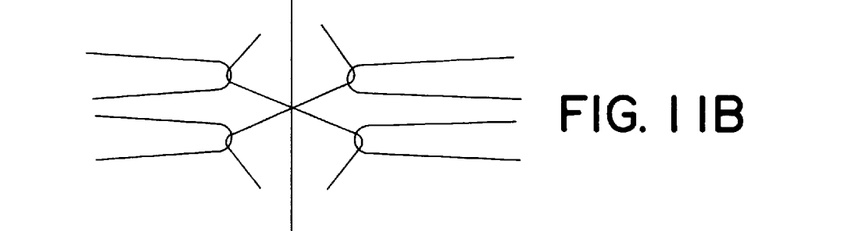
Figure 11C:
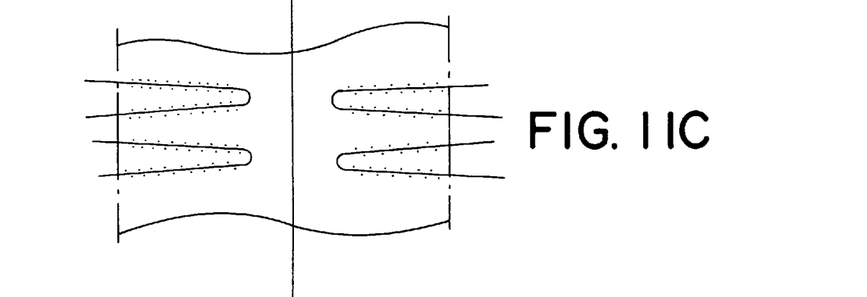

The loops can either be laid face to face (FIGS. 11b and 11c) or be laid side by side (FIG. 11a). To join them, use may in particular be made of a device for assembling the half-reinforcements by stitching (FIG. 11a), or by lacing (FIG. 11b) passing alternately from one loop to the next using one or more lacing filaments. It is also possible to connect using bonding (FIG. 11c) (for example spraying an adhesive that will allow the two half-reinforcements to be joined together at the crown, with or without a narrow strip or any other means for keeping them tensioned).

The method described makes it possible to obtain pretensioning in the filaments of which the carcass reinforcement is composed, that is to say that said filaments are tensioned beyond the effect due to the pressure of inflating the tire. This tension can be obtained by thermal or electromagnetic or mechanical expansion of a former or by laying half-reinforcements with pretensioned filaments, or alternatively by combining the three effects. This pretensioning depends on the desired mechanical properties of the carcass reinforcement.

We claim:

1. A machine for manufacturing a tire carcass half-reinforcement from one single filament wrapped around a bead wire, comprising:

a central device allowing said tire bead wire to be held in a predetermined position.

a lateral device holding a ring which has half as many hooks as there will be arches of carcass filament contained in the tire to be manufactured, said lateral device holding said ring a predetermined distance away from said bead wire and approximately concentric therewith, the planes of said bead wire and of said ring being substantially parallel, said hooks being spread out around the circumference of the ring, means for laying the filament for hooking the filament onto said hooks, forming a loop, the two strands of which are directed toward the bead wire and wrapped around it, each of the strands running on to the adjacent hook after wrapping around the bead wire.

2. The machine as claimed in claim 1, wherein said ring is split between two hooks, thus defining two lips of the slit and, on either side of these, a first hook and a last hook, and comprising means of parting the lips of the slit enough to make space between said first and last hooks for said filament-laying means to pass.

3. The machine as claimed in claim 2, wherein said laying means comprise:

a housing for mounting a reel of filament, said housing being connected to guide means defining a path running in a plane perpendicular to the plane of said bead wire, said path passing through the central space of the bead wire and running around this bead wire, said path crossing the plane of the ring and passing radially inside it, motorized means allowing said housing to move along said path, while rotating said bead wire and said ring in a coordinated fashion at the desired laying pitch.

4. The machine as claimed in claim 3, wherein said path is substantially circular, and said motorizing means have a movement always pointed in the same direction for laying the filament.

5. The machine as claimed in claim 1, wherein the laying means comprise:

auxiliary hooks arranged in two circles separated by a distance that corresponds to twice the length of filament from the bead wire as far as the end of said carcass half-reinforcement, paying-out means allowing the filament to be hooked successively onto said auxiliary hooks of each circle, means for inserting said bead wire radially over said auxiliary hooks and positioning it halfway between the circles of auxiliary hooks, auxiliary transfer means for transferring said loops from said auxiliary hooks onto said hooks, lifting up the filament on either side of said bead wire.

6. The machine as claimed in claim 1, wherein said central device comprises a support mounted concentrically with and to the side of the bead wire, said support substantially defining the shape of the internal cavity of said tire, said support being positioned with respect to the bead wire on the opposite side to said ring, said machine comprising means for laying said loops on the support.

7. The machine as claimed in claim 6, wherein the means for laying the loops comprise at least one arm fitted with a gripper allowing the loops to be picked up one after the other.

8. The machine as claimed in claim 6, wherein the means for laying the loops comprise at least one elastic cylindrical wall.

9. The machine as claimed in claim 6, wherein the means for laying the loops comprise an inflatable bladder.

* * * * *